J. B. EADS.
Turret and Pilot House.

No. 41,207.

6 Sheets—Sheet 1.

Patented Jan. 12, 1864.

J. B. EADS.
Turret and Pilot House.

No. 41,207. Patented Jan. 12, 1864.

J. B. EADS.
Turret and Pilot House.

No. 41,207. Patented Jan. 12, 1864.

J. B. EADS.
Turret and Pilot House.

No. 41,207.

6 Sheets—Sheet 4.

Patented Jan. 12, 1864.

Witnesses

Inventor
James B Eads
By atty A B Stoughton

J. B. EADS.
Turret and Pilot House.

No. 41,207.

6 Sheets—Sheet 6.

Patented Jan. 12, 1864.

Witnesses.   Inventor.

UNITED STATES PATENT OFFICE.

JAMES B. EADS, OF ST. LOUIS, MISSOURI.

IMPROVED TURRET AND PILOT-HOUSE FOR SHIPS OF WAR OR OTHER WAR STRUCTURES.

Specification forming part of Letters Patent No. 41,207, dated January 12, 1864.

*To all whom it may concern:*

Be it known that I, JAMES B. EADS, of the city and county of St. Louis, in the State of Missouri, have invented certain new and useful Improvements in Combining and Operating the Pilot-House and Turret of Gun-Boats or other Vessels of War and Land Fortifications; and I do hereby declare that the following is a full, clear, and exact description of the same, reference being had to the accompanying drawings, making a part of this specification, in which—

Figure 1:
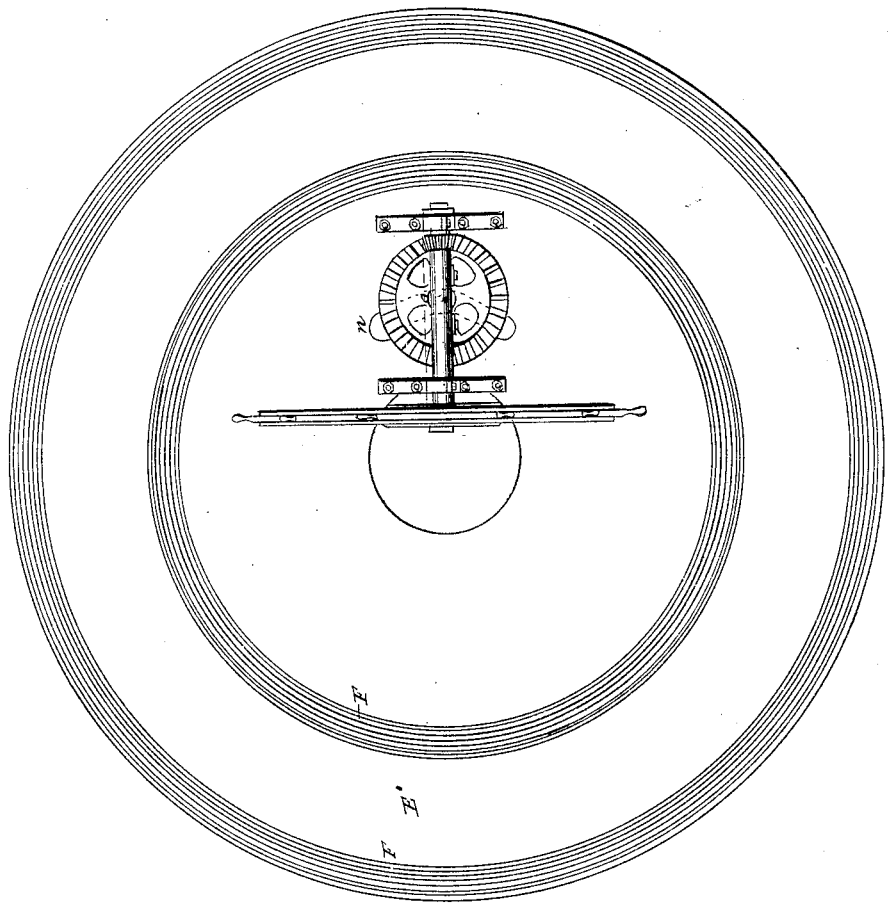
Figure 2:
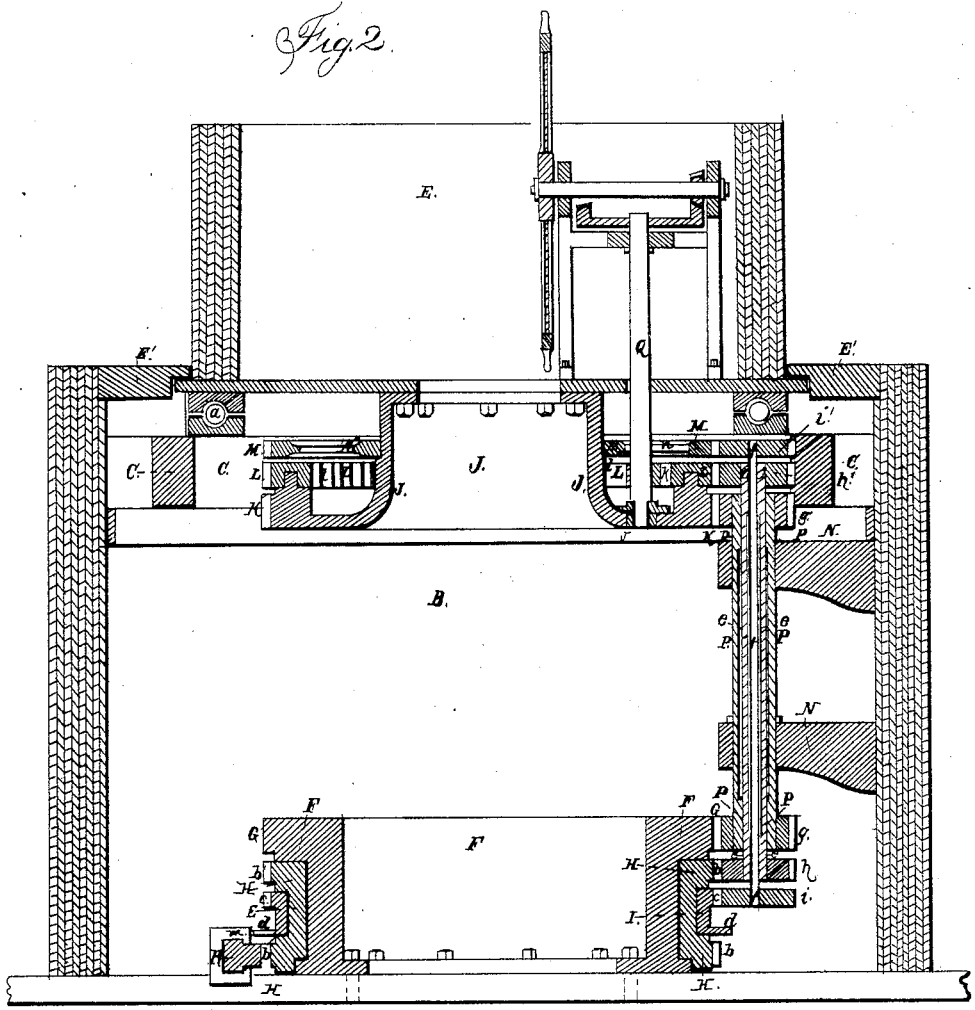
Figure 3:
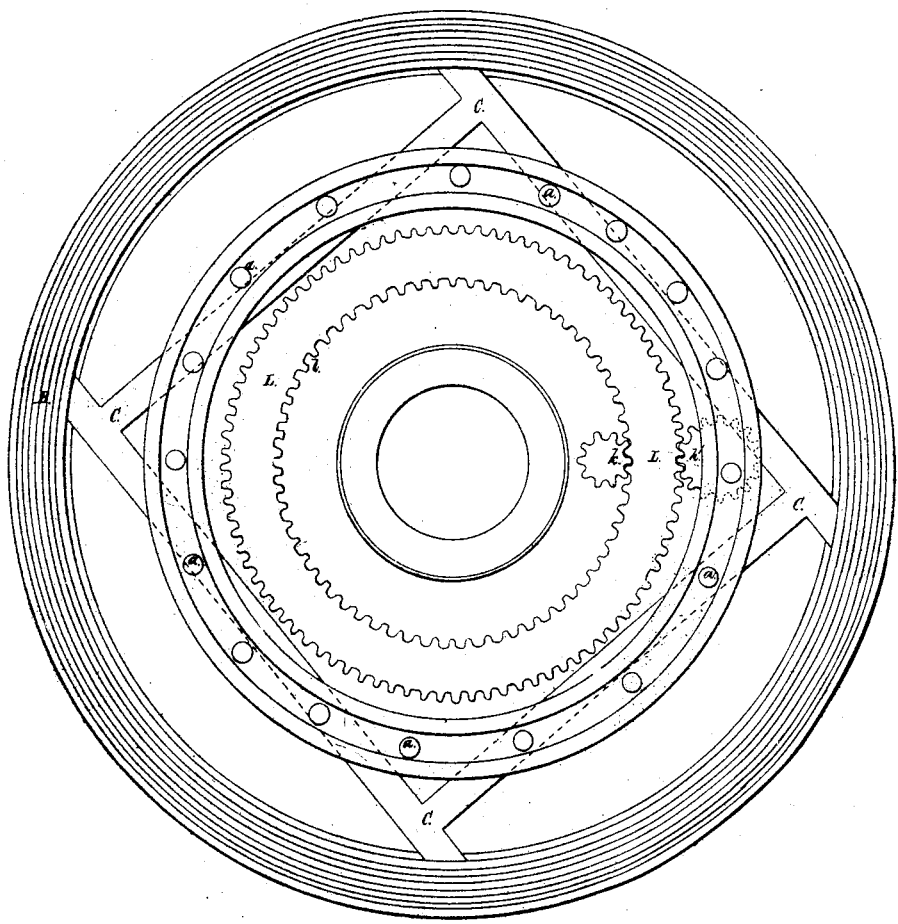
Figure 4:
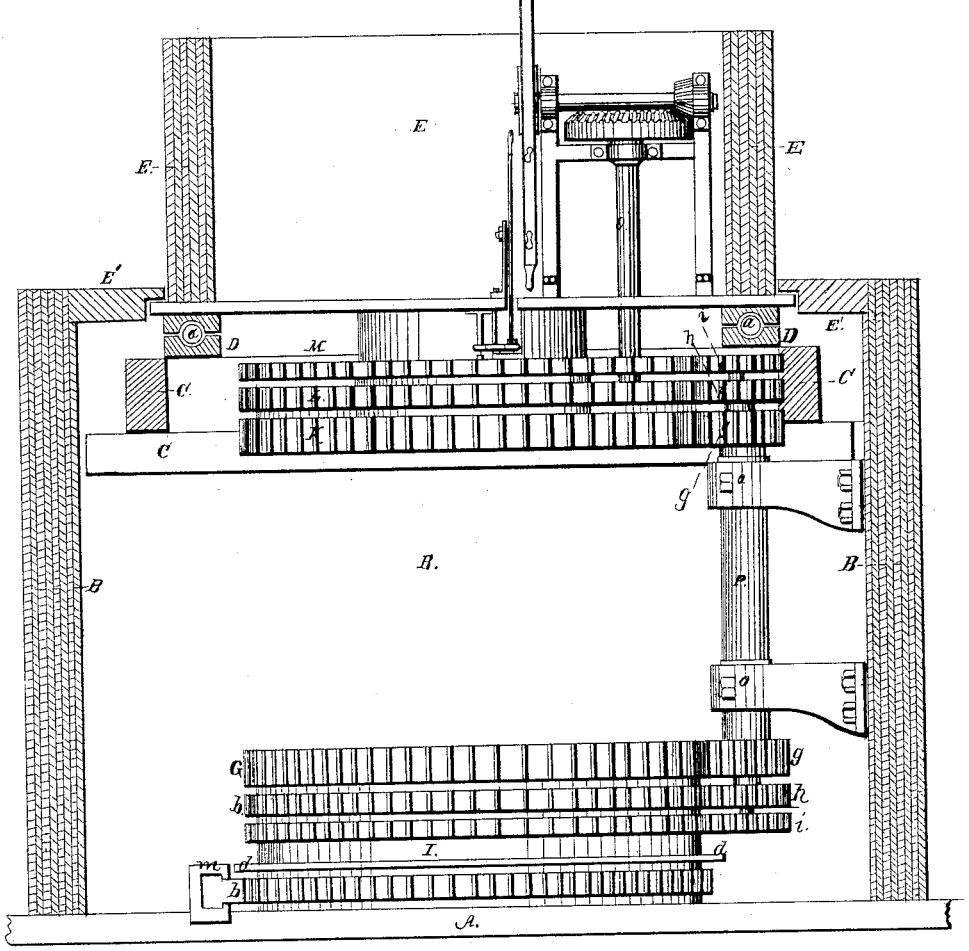
Figure 5:
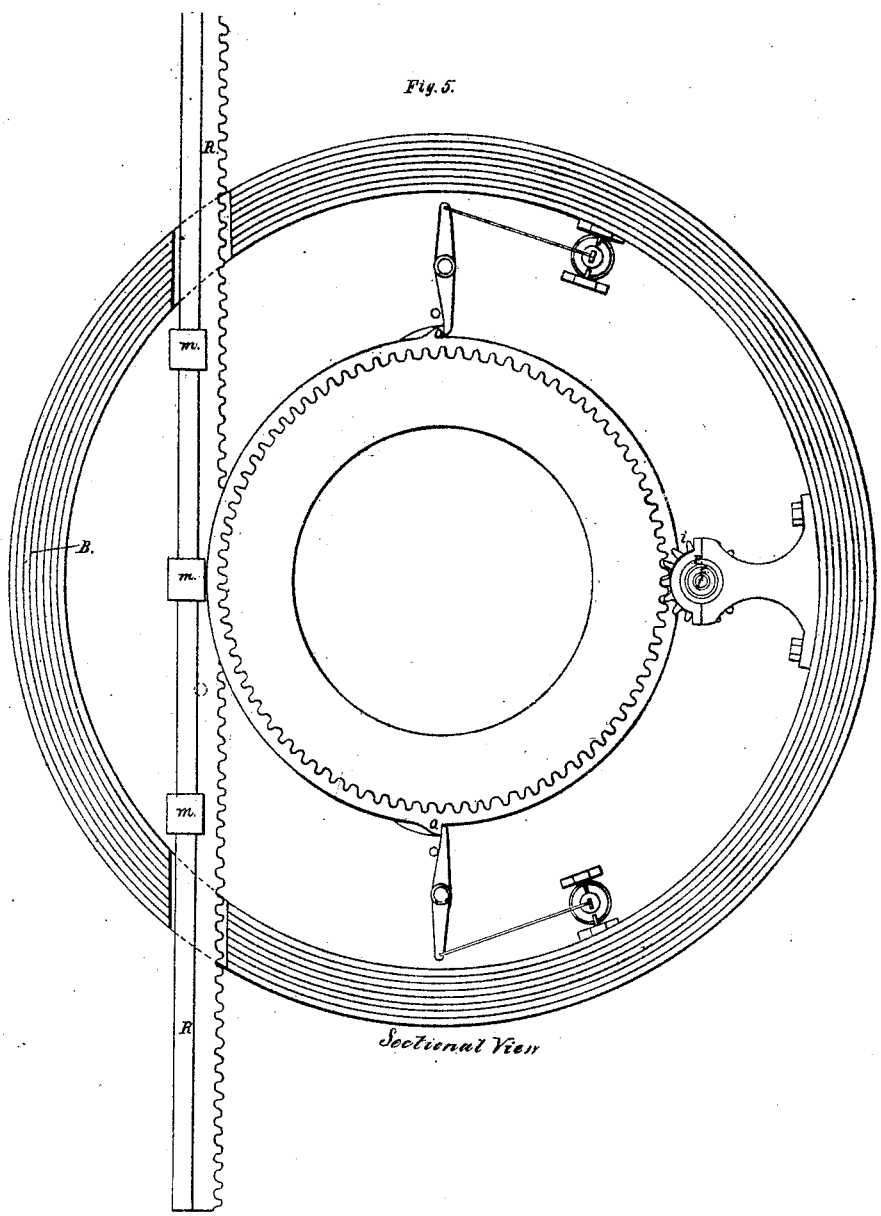
Figures 6, 7:
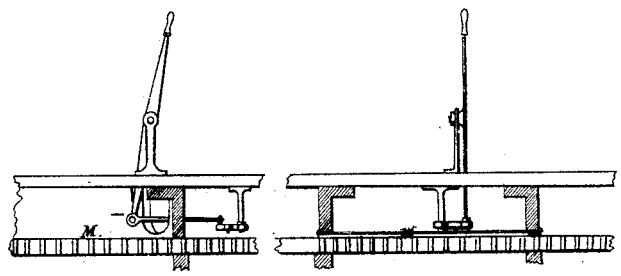
Figure 8:
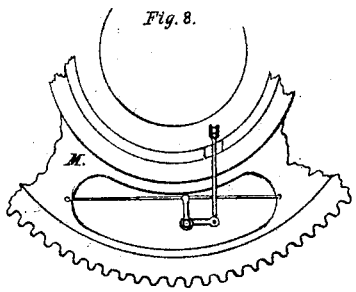
Figure 9:
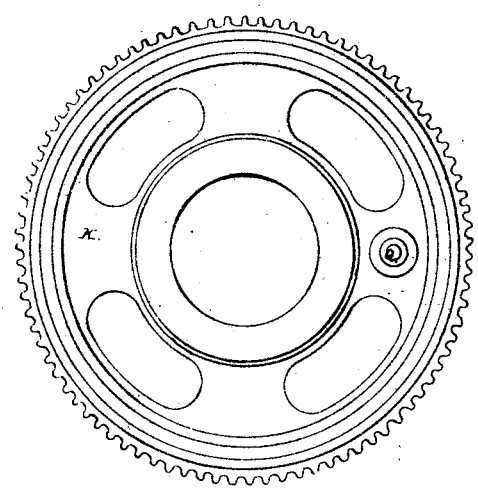
Figure 10:
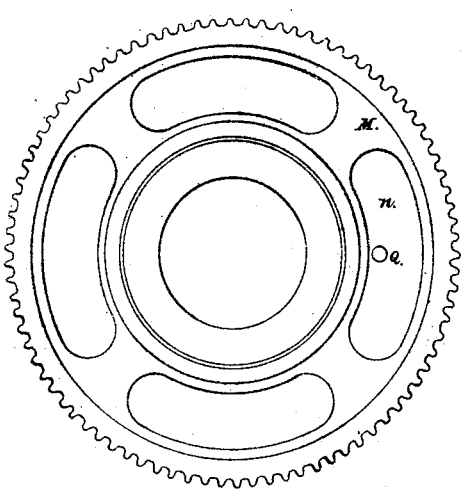

Figure 1 represents a top plan of the pilot-house and turret combined. Fig. 2 represents a vertical section through the same. Fig. 3 represents a top plan of the turret, the pilot-house being removed, but showing the base on which the pilot-house is supported. Fig. 4 represents the pilot-house and turret in section and the machinery therein in full. Fig. 5 represents a horizontal section through the turret near its base, and showing the parts therein arranged. Figs. 6, 7, 8, 9, and 10 represent detached portions of the machinery or apparatus, which will be more specially referred to hereinafter.

Similar letters of reference, where they occur in the several separate figures, denote like parts in all the drawings.

The top of the turret in vessels of war is the most appropriate position for the pilot-house, as it affords the best position for a lookout. Besides, it is in close proximity to the gunners, and the command, by word, signal, &c., is more easily and more certainly passed from one to the other, and from either or both to the engineer, as may be requisite. There are, however, several mechanical objections to such a position or location of the pilot-house. In the first place the turret must be turned or revolved to bring the gun-port and gun to the object to be fired at, while the pilot-house must remain in a certain or fixed position. This could be readily arrived at by placing a column in the center of the turret, upon which the pilot-house could be supported; but such a column or support would interfere with the position and operation of the gun or guns in the turret, and hence is impracticable for the purpose. Supports outside of the turret to rest the pilot-house upon would not answer, because, first, of the exposure to shot or shell; and, secondly, they would interfere with the free and unobstructed range of the gun, and this same cause would operate if the pilot-house occupied a separate position on the vessel, and high enough above decks to afford a good position for looking out over a greater expanse.

The object and purpose of my invention is to avail myself of this most desirable position of the pilot-house—viz., on top of the turret—and to devise means for removing the objections that arise mechanically to such a location; and the nature of my invention consists in placing the pilot-house on the turret in such manner that the turret may revolve freely, while the pilot-house remains stationary without using a central support or column to hold the pilot-house and keep it from turning; and my invention further consists in means for transmitting the power of the pilot to the tiller-ropes below the turret; and as incidental to such transmission the further providing of means or appliances for passing signals from the pilot-house to the engineer or other officer of the vessel.

To enable others skilled in the art to make and use my invention, I will proceed to describe the same with reference to the drawings.

A represents a base or bed-plate, upon which the turret B is supported, and upon which it it may be freely turned in any of the usual well-known ways, friction wheels or balls being inserted or placed between the base of the turret and the bed-plate to relieve the weight and friction thereof. Near the top of the turret and inside thereof, is a frame, C, Fig. 3, upon which is placed a circular way, D, with a groove formed in its top surface, for the friction-balls $a\ a\ a$ to run in. The pilot-house E may be much smaller in diameter than the turret, and of about the same diameter of the circular way D, and in its under portion is formed a rounded groove similar to that in the circular way D, so as to take in and rest upon the friction-balls $a\ a$, &c. The pilot-house may be covered for the sake of protection, though I have shown it as without a covering; but it would be rare that a shot or shell could enter at its top even if uncovered. The thickness of the cylinders that form the pilot-house and turret may vary to suit the circumstances of the case, and does not circumscribe the scope of my invention. Between the base of the pilot-house and the top of the turret a circular plate, E', is introduced to cover and protect the space between the two. On the base or bed-plate A there is a stationary hub, F, which has upon its upper portion a fixed cog-gear, G, running entirely around it. On or against the body of the hub F there is a double-cogged ring, H, which can turn around the hub, and on or against this double-cogged ring H, and between its cogged gears $b\ b'$, there is another cogged ring, I, which can move upon and independent of the ring H, as said ring H can move upon and independent of the hub F, which supports it. The ring I carries, in addition to its cogged gear $c$, a cam-ring, $d$, which is designed for ringing a bell to sound an order from the pilot to the engineer. On the base of the pilot-house E, and underneath said base, there is a fixed hub, J, which has upon its lower end a fixed cogged gear, K, and above the cogged gear K there is a loose cogged ring, L, that can freely turn on the hub J, and above the cogged ring L there is a second loose cogged ring, M, which can turn independently of the hub J, and also independently of the loose cogged ring L. To the inside of the turret B there are affixed two arms or brackets, N N, which can be made adjustable to compensate for the wear or play of the cogged gear and the moving parts to which they are attached. These brackets N are furnished with suitable boxes or bearings, O, in which a hollow vertical shaft, P, is supported and turns. Inside of the hollow shaft P there is a second hollow shaft, $e$, which projects beyond either end of the shaft P, and inside of the hollow shaft $e$ there is a shaft, $f$, which projects beyond the ends of the shaft $e$. The shaft P has two pinions, $g\ g'$, upon it, one at each end thereof, which pinions work into the cogged rims G K on the respective hubs F J. The shaft $e$ has upon it two pinions, $h\ h'$, one at each of its ends, which mesh with or work into the cogged rings H L, which are loose upon the hubs F J; and the shaft $f$ has upon it two pinions, $i\ i'$, one at each of its ends, which work into the two loose cogged rings I and M on the hubs F J, and thus the gears of the pilot-house and the gears of the turret are connected by gears which admit of the turret being revolved without revolving the pilot-house, while the pilot can not only transmit his power through said gearing to the tiller-ropes, but also to the signal-bell, at pleasure.

In the pilot-house E there is a vertical shaft, Q, which may be turned by a wheel through gears or in any other well-known way. This shaft has its bottom bearing at $j$ in the hub J, and near its lower end carries a pinion, $k$, that takes into the internal gear $l$ of the loose-cogged ring L, and thus turns said ring, and as the ring L meshes with the gear or pinion $h'$ on the upper end of the hollow shaft $e$ said shaft $e$ is also turned, and in turning revolves the pinion $h$ at its lower end, which, by gearing with the cogs $b'$ on the ring H, turns said ring. Now, the lower cogs, $b$, on the ring H take into the teeth on a straight rack, R, that moves in guides $m$, and moving said rack may also move the rudder, which is connected therewith by tiller-ropes in any of the usual well-known ways; and thus the pilot from his position on top of the turret may steer the vessel by gearing which in no wise incumbers the gun-space in the turret, and which in no wise prevents the turret from revolving while the pilot-house remains stationary. There is a circular slot, $n$, through the loose ring M, that the shaft Q passes through, the object of the slot being that said ring may have some motion around the hub J, for the purpose of ringing a bell as a signal to the engineer or other officer from the pilot-house. The ring M gears with the pinion $i'$ on top of the shaft $f$, and thus turns said shaft. The pinion $i$ on the lower end of the shaft $f$ gears with the loose ring I and turns it, and in turning it turns the cam-ring $d$, which has tappets $o$, Fig. 5, upon it, which come in contact with a spring, bell-crank, or lever, and cause said crank or lever to strike a bell and give a signal. The wheel M may be moved by a bell-pull, lever, or any other means to cause it to operate on the bell. Its movement need not be much, but a few inches at its perimeter giving a corresponding movement of the bell-wheel $d$. When the turret is revolved, the pinions will roll around in their gears, or else the shafts will turn upon or within each other, or else the loose rings will move around the hubs, each and every part being so connected as to be independent of each and every other part that would tend to connect rigidly the pilot-house and turret together, and thus the turret can revolve while the pilot-house will remain stationary, though both are connected by gearing through which the pilot may steer the vessel and ring the signals to the engineer or other officer.

Access to and from the pilot-house is had through the hub J, which is made hollow for that purpose.

I have shown but one set of gearing for accomplishing the purposes herein stated, and in using one set it must necessarily be placed at one side, so as not to interfere with the operating of the gun or guns in the turret. If found essential, two sets of gears may be used, and on opposite sides of the turret, which would cause the parts to move with more certainty of avoiding excessive friction or cramping.

I have also described this invention in connection with ships or vessels of war only; but it may be advantageously used on land or permanent fortifications, and so that the officer in command may occupy the position or place of the pilot on board of vessels, it affording a safe lookout whence orders to the gunners or engineers below may with equal facility be given; and in the event of iron-clad land fortifications being adopted, which may be regarded as a settled problem, this construction will become highly important and available for such purpose.

Having thus fully described my invention, what I claim is—

1. Placing a pilot-house or lookout on a turret or other revolving iron-clad or shielded protector in such manner that the turret may revolve freely while the pilot-house remains stationary, and without using a central column or support to hold the latter from turning, substantially as and for the purpose described.

2. The mechanism connecting the pilot-house or lookout with the turret or gun-protector, so that the occupant of the house or lookout may transmit his power to the tiller-ropes, or to the bell or bells for signaling to the engineer or other officer in charge, substantially as herein described.

JAS. B. EADS.

Witnesses:
    A. B. STOUGHTON,
    EDM. F. BROWN.